(12) United States Patent
Nichols

(10) Patent No.: US 10,076,993 B2
(45) Date of Patent: Sep. 18, 2018

(54) LIGHTING DEVICE WITH VISIBLE LIGHT ILLUMINATION AND ULTRAVIOLET LIGHT ILLUMINATION THAT IS BROADER THAN THE VISIBLE LIGHT ILLUMINATION AND VEHICLE HAVING THE SAME

(71) Applicant: AVID Labs, LLC, Fort Wayne, IN (US)

(72) Inventor: Joel Nichols, Columbia City, IN (US)

(73) Assignee: Avid Labs, LLC, Fort Wayne, IN (US)

( * ) Notice: Subject to any disclaimer, the term of this patent is extended or adjusted under 35 U.S.C. 154(b) by 36 days.

(21) Appl. No.: 15/205,683

(22) Filed: Jul. 8, 2016

(65) Prior Publication Data

US 2017/0009956 A1    Jan. 12, 2017

Related U.S. Application Data

(60) Provisional application No. 62/190,376, filed on Jul. 9, 2015.

(51) Int. Cl.

| | |
|---|---|
| *F21S 41/13* | (2018.01) |
| *B60Q 1/02* | (2006.01) |
| *F21S 41/141* | (2018.01) |
| *F21S 41/14* | (2018.01) |
| *F21Y 115/10* | (2016.01) |
| *F21Y 113/13* | (2016.01) |

(52) U.S. Cl.
CPC .............. *B60Q 1/02* (2013.01); *F21S 41/13* (2018.01); *F21S 41/141* (2018.01); *F21S 41/18* (2018.01); *F21Y 2113/13* (2016.08); *F21Y 2115/10* (2016.08)

(58) Field of Classification Search
CPC .......... F21S 41/13; F21S 41/141; F21S 41/18; B60Q 1/02
See application file for complete search history.

(56) References Cited

U.S. PATENT DOCUMENTS

| | | | | |
|---|---|---|---|---|
| 4,970,628 A | * | 11/1990 | Bergkvist | ............. F21S 48/1186 362/263 |
| 5,255,163 A | * | 10/1993 | Neumann | ............ F21S 48/1131 362/293 |
| 6,122,093 A | | 9/2000 | Lynam | |
| 2004/0105264 A1 | * | 6/2004 | Spero | ........................ B60Q 1/04 362/276 |

* cited by examiner

*Primary Examiner* — Anh Mai
*Assistant Examiner* — Steven Horikoshi
(74) *Attorney, Agent, or Firm* — Taylor IP, P.C.

(57) ABSTRACT

A lighting device including an ultraviolet light source emanating ultraviolet light, a visual light source and a light directing device. The visual light source is coupled to the ultraviolet light source, and the visual light source emanates visual light. The light directing device is arranged to direct the visual light in a first direction primarily within an angle of illumination. The light directing device is further arranged to direct the ultraviolet light in an area wider than the angle of illumination.

17 Claims, 1 Drawing Sheet

LIGHTING DEVICE WITH VISIBLE LIGHT ILLUMINATION AND ULTRAVIOLET LIGHT ILLUMINATION THAT IS BROADER THAN THE VISIBLE LIGHT ILLUMINATION AND VEHICLE HAVING THE SAME

CROSS REFERENCE TO RELATED APPLICATIONS

This is a non-provisional patent application based on U.S. Provisional Application Ser. No. 62/190,376, entitled "LED LIGHTING PRODUCT, filed Jul. 9, 2015 which is incorporated herein by reference.

BACKGROUND OF THE INVENTION

1. Field of the Invention

The present invention relates to lighting for use in transportation and industrial equipment used in mining, construction, automotive, investigations, land surveying, emergency services in low light conditions.

2. Description of the Related Art

Traditionally low light conditions have presented a hazard to construction workers and the like, thus personal protective equipment is often used to promote visibility. The introduction of LED lighting technology has reduced much of the ultraviolet (UV) radiation emitted from an artificial source to near zero. While the efficiency of the LED lighting is very desirable, its use alters the spectral breadth of the light being produced. The lack of ultraviolet light degrades the effectiveness of safety markings placed on equipment and the clothing and safety equipment worn by personnel, in that many of such markings are designed to fluoresce, which requires the presence of UV spectral power.

Ultraviolet light is an electromagnetic radiation with a wavelength from roughly 10 nm (30 PHz) to 380 nm (750 THz), which is a shorter wavelength than that of visible light but longer than X-rays. UV radiation is present in sunlight, and also produced by electric arcs and specialized lights such as mercury-vapor lamps, tanning lamps, and black lights. Although the UV light lacks the energy to ionize atoms, long-wavelength ultraviolet radiation can influence chemical reactions, and causes many substances to glow or fluoresce.

In U.S. Pat. No. 6,122,093 there is disclosed a reduced ultraviolet radiation transmitting, safety protected electrochromic glazing assembly. The electrochromic glazing assembly has reduced UV radiation transmission and safety protection. The assembly may include at least a pair of glass or other elements confining an electrochromic medium therebetween. Ultraviolet radiation reducing means are incorporated for reducing ultraviolet radiation transmission through the assembly. A polymeric antilacerative layer is disposed on one surface of one of the glass elements for preventing lacerative injuries (Abstract). There is much prior art directed at the reducing of UV transmission, which is part of the problem that is addressed by the present invention.

What is needed in the art is a means of providing the needed ultraviolet radiation in conjunction with light of the visible light spectrum, to improve the fluorescing of reflectors in low light conditions.

SUMMARY OF THE INVENTION

The present invention provides an integrated light featuring a UV source that is widely disbursed.

The invention in one form is directed to a lighting device including an ultraviolet light source emanating ultraviolet light, a visual light source and a light directing device. The visual light source is coupled to the ultraviolet light source, and the visual light source emanates visual light. The light directing device is arranged to direct the visual light in a first direction primarily within an angle of illumination. The light directing device is further arranged to direct the ultraviolet light in an area wider than the angle of illumination.

The invention in another form is directed to a vehicle having a lighting device including an ultraviolet light source emanating ultraviolet light, a visual light source and a light directing device. The visual light source is coupled to the ultraviolet light source, and the visual light source emanates visual light. The light directing device is arranged to direct the visual light in a first direction primarily within an angle of illumination. The light directing device is further arranged to direct the ultraviolet light in an area wider than the angle of illumination.

An advantage of the present invention is that UV spectral density is added to the visual light.

Another advantage of the present invention is that UV light is additionally directed to low light areas apart from the directed visual light.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
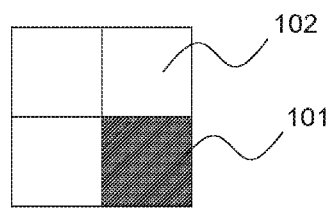
FIG. 1 is a schematical view of an embodiment of a multi-die LED chip with a UV emitter and visible light emitters as an assembly of the present invention.

Referring now to the drawings, and more particularly to FIG. 1, there is shown a multi-die LED chip with a single UV emitter 101, with the rest of the chip emitters 102 being primarily visible light emitters 102.

Figure 2:
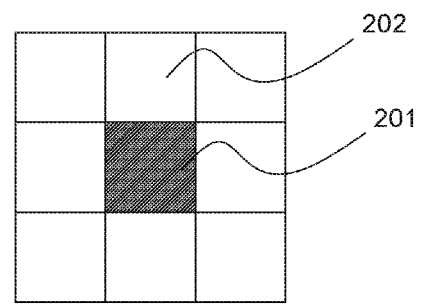
FIG. 2 is a schematical view of another embodiment of a multi-die LED chip with a UV emitter and visible light emitters of the present invention.
Figure 3:
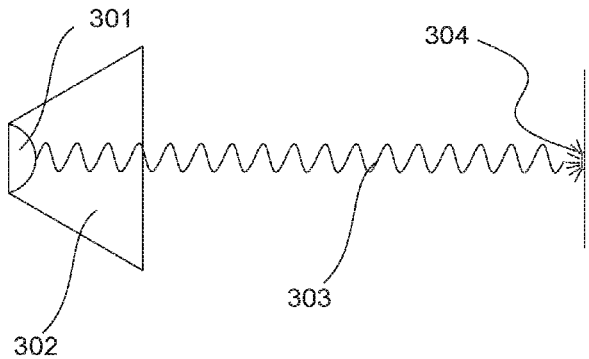
FIG. 3 illustrates how an emitter of FIG. 1 or 2 radiates visible light and UV radiation that causes a surface to fluoresce from the UV radiation hence becoming more visible.

In a like manner in FIG. 2 there is shown another multi-die LED chip configuration with a single UV emitter 201 in the middle and surrounded with adjacent emitters 202 that are in the visible spectrum. The chip arrangements of FIG. 1 or FIG. 2 can be used with a total internal reflectance (TIR) arrangement, a light directing device, such as a lens or a reflector 302 as shown in FIG. 3. An emitter 301 (of a configuration, for example, shown in FIG. 1 or 2) radiating visible light and UV radiation 303 in reflector 302 hits a fluorescent surface 304. Surface 304 will fluoresce from the UV radiation 303 hence become more visible as illustrated with the lines emanating from surface 304.

Figure 4:
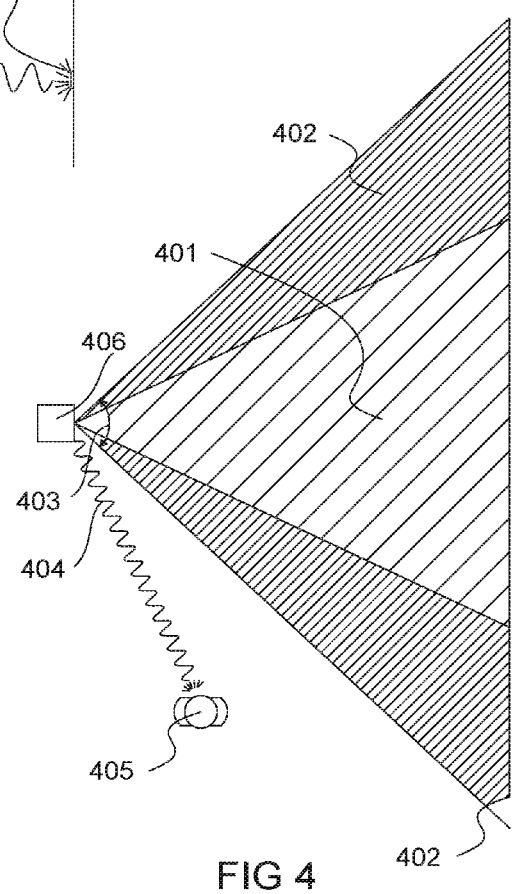
FIG. 4 is a depiction of how the present invention causes a reflective surface in a low light condition to fluoresce.

Now, additionally referring to FIG. 4 fixture 406 includes either emitters 101 and 102, or emitters 201 and 202, that send out a beam 401 with a field of visual light illumination 402 having an angle of illumination 403, and a further UV illumination 404 that is wider than angle 403 as illustrated in FIG. 4. Illumination 404 is wider than beam area 401, and wider than illumination area 403 so that fluorescent material 405 will be visually apparent outside of illumination angle 403.

Visual spectrum Light Emitting Diodes are a growing technology. Intentionally they do not emit UV radiation and this is often seen as a benefit to most industries, however safety equipment is primarily designed to fluoresce upon being illuminated with UV light. Current visual spectrum LEDs do not excite fluorescent materials due to the lack of UV radiation emitted, hence introducing a UV emitting diode, as discussed herein, will improve fluorescence and in-turn improve visibility to thus improve safety. The present invention uses ultraviolet radiation from sources 101 and 201 in the wavelength range of 360 nm to 385 nm along with white light sources 102 and 202 specifically to improve safety in low light conditions.

An apparatus 301 or 406 emitting ultraviolet radiation 303, 404 improves the fluorescence of personal protective equipment 304, 405 in low light conditions. The source of the UV radiation 101, 201 as well as the visible light source 102, 202 are light emitting diodes (LED).

The UV sources 101, 201 are shown combined with visible light source 102, 202 on one substrate or the same die, as is abstractly illustrated in FIGS. 1 and 2. The combined source may use lensing or reflectors 302 to provide direction. The LED sources may include a widened spectrum including UV light emitting sources 101, 201 and visual light emitting sources 102, 202, for example, with a spectrum from 360 nm to 670 nm.

The LED apparatus as described herein and shown in FIGS. 1-4 allows for improved fluorescence, which will improve safety for workers in the area, through better visibility of equipment. The equipment 405 may be reflective vests, road signs, road markers, traffic cones, reflective tape and a UV reactive painted surface.

Fixture 406 can be a vehicle 406 having multiple lights thereon with at least one having the characteristics discussed herein. Emitters 101 or 102, and emitters 201 or 202, send out a beam 401 with a field of visual light illumination 402 having an angle of illumination 403, and a further UV illumination 404 that is wider than angle 403 as illustrated in FIG. 4. Illumination 404 is wider than beam area 401, and wider than illumination area 403 so that fluorescent material 405 will be visually apparent outside of illumination angle 403. The field of illumination with the UV light is symmetrically arranged on both sides of angle 403 and is even continuously distributed throughout the wider angle.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lighting device comprising:
    an ultraviolet light source emanating ultraviolet light;
    a visible light source coupled to the ultraviolet light source, the visible light source emanating visible light; and
    a light directing device arranged to direct the visible light in a first direction primarily within an angle of illumination, the light directing device being further arranged to direct the ultraviolet light in an area wider than the angle of illumination, with the angle of illumination being centrally located within the wider area thereby causing the ultraviolet light to be symmetrically arranged relative to the area of illumination.

2. The lighting device of claim 1, wherein the ultraviolet light source and the visible light source are on a common substrate.

3. The lighting device of claim 2, wherein the ultraviolet light source is adjacent to a plurality of visible light sources.

4. The lighting device of claim 1, wherein the ultraviolet light source emanates the ultraviolet light primarily in the wavelength 360 nm to 385 nm range.

5. The lighting device of claim 1, wherein the ultraviolet light source combined with the visible light source emanates primarily in the wavelength 360 nm to 670 nm range.

6. The lighting device of claim 1, wherein the ultraviolet light source and the visible light source are both light emitting diodes.

7. The lighting device of claim 1, wherein the ultraviolet light is directed toward fluorescent material in a second direction apart from the angle of illumination.

8. The lighting device of claim 7, wherein the fluorescent material is part of an item that is wearable by a person.

9. The lighting device of claim 1, wherein the ultraviolet light continuously distributed across the wider area.

10. A vehicle having a light fixture coupled thereto, the light fixture comprising:
    an ultraviolet light source emanating ultraviolet light;
    a visible light source coupled to the ultraviolet light source, the visible light source emanating visible light; and
    a light directing device arranged to direct the visual light in a first direction away from the vehicle primarily within an angle of illumination, the light directing device being further arranged to direct the ultraviolet light in an area wider than the angle of illumination, with the angle of illumination being centrally located within the wider area thereby causing the ultraviolet light to be symmetrically arranged relative to the area of illumination.

11. The vehicle of claim 10, wherein the ultraviolet light source and the visible light source are on a common substrate.

12. The vehicle of claim 11, wherein the ultraviolet light source is adjacent to a plurality of visible light sources.

13. The vehicle of claim 10, wherein the ultraviolet light source emanates the ultraviolet light primarily in the wavelength 360 nm to 385 nm range.

14. The vehicle of claim 10, wherein the ultraviolet light source combined with the visible light source emanates primarily in the wavelength 360 nm to 670 nm range.

15. The vehicle of claim 10, wherein the ultraviolet light source and the visible light source are both light emitting diodes.

16. The vehicle of claim 10, wherein the ultraviolet light is directed toward fluorescent material in a second direction apart from the angle of illumination.

17. The vehicle of claim 16, wherein the fluorescent material is part of an item that is wearable by a person.

* * * * *